Figure 1:
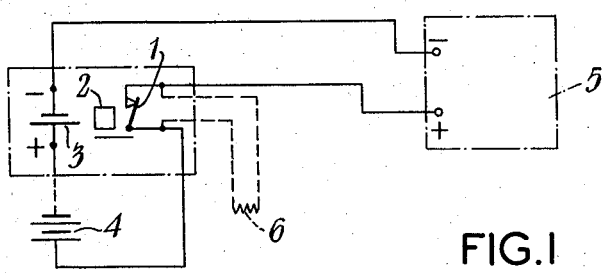

Aug. 27, 1963   H. M. HARMER   3,102,222
REGULATION OF THE CHARGING OF SECONDARY BATTERIES
USING A MEANS RESPONSIVE TO THE TEMPERATURE
OF A CATALYTIC DEVICE
Filed June 1, 1961

INVENTOR
HAROLD MARTIN HARMER
By Shoemaker and Mattare
ATTYS.

3,102,222
REGULATION OF THE CHARGING OF SECONDARY BATTERIES USING A MEANS RESPONSIVE TO THE TEMPERATURE OF A CATALYTIC DEVICE
Harold Martin Harmer, Brentwood, England, assignor to Miranda Corporation, New York, N.Y., a corportaion of New Mexico
Filed June 1, 1961, Ser. No. 114,203
Claims priority, application Great Britain June 9, 1960
3 Claims. (Cl. 320—36)

This invention concerns improvements relating to the control or regulation, particulary control of the charging, of one or more secondary cells, particularly from an A.C. source, utilising the temperature variation in a catalytic device, fitted to or made as part of a cell or cells, with the aid of which the hydrogen and oxygen gases produced by electrolysis are converted into water.

According to the invention, a control arrangement comprises, in combination with a battery of at least one cell and a control circuit for the said battery, a catalytic device provided in a said cell and adapted for causing hydrogen and oxygen gas produced by electrolysis in the cell to be converted into water and a temperature-sensitive switch arranged adjacently to the catalytic device so as to respond to the temperature of the said device and having its contacts connected in the said circuit.

As the point at which electrolysis and gassing normally occur in a cell is very near to the point of full charge, or over-rate discharge, the arrangement according to the invention can be made to provide effective control for the charging or discharging of the cell and/or an indication of conditions of charging or discharging.

In particular, the rise of temperature of the catalytic device produced by the proportion, under some conditions the whole, of the charging current which electrolyses the water content of the electrolyte can therefore be used to close or open switch contacts in a battery-charging circuit and thus control the value of the charging current, either directly or indirectly, in such a manner that the said current is interrupted or caused to change in value in required fashion.

With suitable on and off temperature settings of the temperature-sensitive switch, gas released and stored in the cell or cells after the charging current has been so interrupted or reduced by the action of the said switch can be made to maintain the temperature of the catalytic device and hold the switch in the operated condition for the period of time necessary for the major portion of this gas to be released. If the change in the charging current produced by the temperature-sensitive switch is such that the rate of electrolysis is insufficient to maintain the temperature of the catalytic device above the value required to hold the switch, then, apart from the aforesaid period of time required by the cell or cells to give up the stored gas, which period may be reduced if discharge occurs, the switch will operate to cause the charging current to be re-established at the high value. High efficiency with respect to the power required to charge the battery and the output power obtainable therefrom can thereby be achieved. The total electrolysis is reduced and account is taken automatically, by way of the amount of gas produced, of the temperature of the electrolyte.

During charging, the period for which the charging current is re-established will get progressively less as a greater proportion of the total current is applied to the electrolysis and the cell or cells tend towards full charge. Use can be made of the decreasing periods for which the charging current is flowing, in relation to a predetermined period, to disconnect the charging means entirely from its source of supply. Alternatively, the charging means may be automatically disconnected after a pre-arranged number of switching operations. In either case, if there is a load circuit across the battery, a further electromagnetic or thermally operated relay in its circuit may be used to restore connection. The predetermined period may be provided by an electrical or mechanical timing device.

Figure 2:
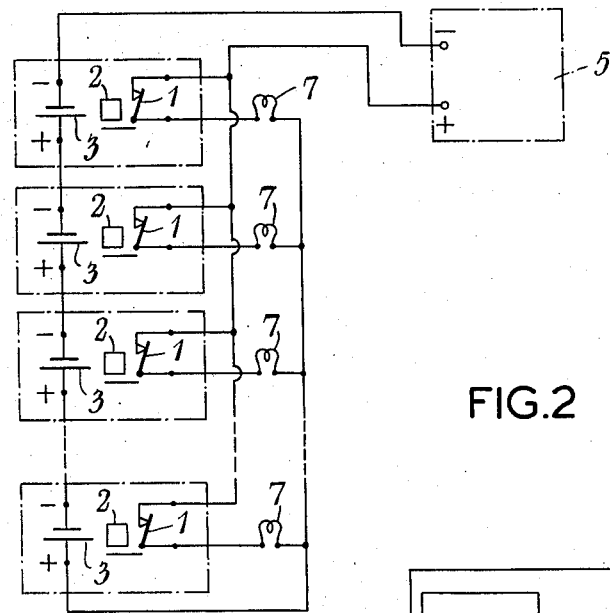
Figure 3:
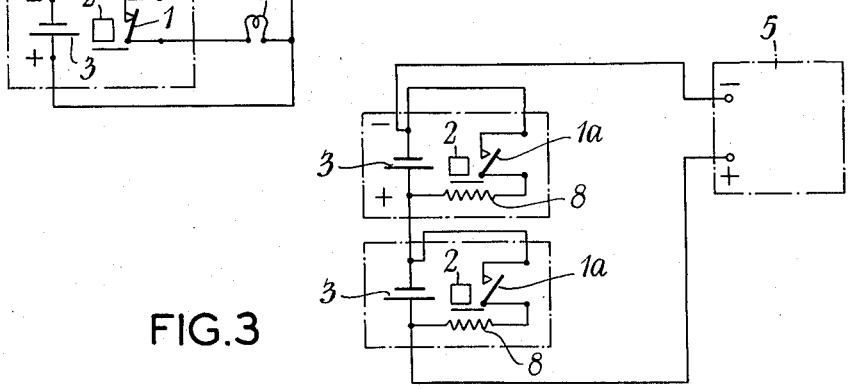

Ways of carrying the invention into effect will now be more fully described by way of example and with reference to the accompanying drawing, in which FIGURES 1, 2 and 3 are circuit diagrams.

In FIGURE 1, a temperature-sensitive switch 1 is disposed closely adjacent to the catalytic device 2 in a cell 3, which may be a single cell or, as shown, one cell of a battery 4. The switch 1 is suitably a bimetal switch, but other forms of temperature-sensitive switch may be employed, such as a contact-making thermometer-type of switch or a switch which otherwise utilises the expansion of a gas, of oil or other liquid or of a metal. Suitable forms or arrangements of catalyst device 1 are described in the specifications of United States Patent No. 2,687,448 and applications Nos. 90,275 and 69,636.

In the simple arrangement illustrated, the contacts of the switch 1 are normally closed and are connected in series with the battery 4 and a charging unit or system 5 which may be of any suitable known type. The switch 1 is arranged to open when the temperature of the catalyst, heated in the above-described manner, reaches a predetermined value. The charging current is thus interrupted and remains interrupted until the switch 1 recloses due to fall of temperature of the catalytic device. Alternatively, the opening of the switch 1 may reduce the charging current to a predetermined low value, for example if a shunt resistance 6 is connected across the switch contacts, as indicated by broken lines.

Particularly if the charging current is larger than the contacts of the switch 1 can handle, relay means or relay and contactor means, energised from theb attery or an auxiliary supply, may be interposed between the switch 1 and the charging unit 5. In this case, the contacts of the switch 1 may be arranged either to close or to open when the predetermined temperature is reached. With such intermediate means, moreover, either the output from or the input to the unit 5 may be controlled. In the latter case, the intermediate means also serves to isolate the said input from close physical relationship with the catalytic device and the cell. If the charging current is not to be interrupted, but is to be reduced to a low value, a resistance, similar in function to the resistance 6 may be connected across the relay or contactor contacts which directly control the charging current. If the unit 5 supplies rectified current from an A.C. source and the said relay or contactor contacts are in an A.C. circuit, a reactance or combination of reactance and resistance may be used instead of the aforesaid resistance.

If desired, two or more temperature-sensitive switches may be associated with one catalytic device 2, so as to permit of more than one change or stage in the charging operation. Such switches may be arranged to operate on successive attainments of the same temperature or at different temperatures corresponding to different rates of electrolysis or gassing. The charging current can then be caused to be regulated in different ways in dependence upon the conditions indicated by the different temperatures.

As already stated, FIGURE 1 illustrates a simple case in which one cell is fitted with a switch 1 and controls the charging of all the cells of the battery. If each of the cells of a battery is fitted with a normally closed switch 1 and the switches are connected in parallel, the charging current will not be interrupted or reduced until the last of the switches has opened. On the other hand, if such switches are connected in series, the charging current will be interrupted or reduced directly the first switch opens. If each cell is fitted with two switches, one set of switches may be connected in series and arranged to reduce the charging current when the first switch of the set opens, while the other set is arranged to interrupt the said current completely or reduce it to a trickle value when all the switches of the said other set have opened.

FIGURE 2 illustrates a practical example of an arrangement in which a switch 1 is associated with the catalytic device 2 of each cell 3 of a battery. Each switch 1 has a lamp or barretter 7 in series with its contacts, the said contacts being connected, in parallel with each other, in series with the charging unit 5 and the whole battery. As each switch 1 opens in response to the attainment of the predetermined temperature in the catalytic device of the associated cell, the charging current is progressively reduced until, when the last switch is opened, the said current is interrupted or brought to a predetermined low value, as required. The illumination of the lamps or barretters indicates in what switches current is flowing and the extinction of all of them that the battery is charged. Failure of a particular lamp or barretter to extinguish affords an indication of a faulty cell, catalytic device or switch. A distinctive lamp may be provided on the charging unit 5 for indicating when it is supplying charging current.

The provision of a switch on each cell has the advantage of greater reliability, since all the catalytic devices, switches or cells must fail, before the control or indication afforded by the switches completely fails.

FIGURE 3 illustrates an alternative arrangement for reducing the charging current. In this case, each switch 1a has its normally open contacts connected, in series with a resistance 8, across the terminals of the associated cell 3. When a switch 1a closes on the attainment of the predetermined temperature, it shunts the associated cell by a resistance 8 and thus reduces the current in that cell. Each resistance may comprise a diode or diodes whose forward or reverse voltage/current characteristic is utilised to ensure a substantially constant voltage across the associated cell when the switch 1 is closed.

If two switches are fitted to each cell, then the arrangement of FIGURE 3 may be combined with that of FIGURE 2, the switch 1 operating after the manner of FIGURE 2 being arranged to open when the switch 1a, for the same cell, operating after the manner of FIGURE 3 closes. Then not only is the current in the individual cell reduced, but also the current passing through the whole battery.

Where, with any of the above arrangements, the supply to the charging unit 5 is A.C., changes of resistance brought about in the charging-current circuit by operation of switches 1 or 1a may be transferred to or arranged to be reflected in the alternating-current circuit by way of a transformer or transformers or may be used to regulate the current in the control circuit of a transductor or transductors in the said A.C. circuit in such a manner as to effect control of the charging current in the battery. Alternatively, with the same object, switches 1 or 1a may control the gate current to gated diodes in the A.C. circuit or the base current of transistors in an A.C. or D.C. circuit in the unit 5.

Arrangements in accordance with the present invention may be used in conjunction with arrangements, using non-mechanical or static regulating means, such as are described in the specifications of United States patent application No. 69,636 and United Kingdom application No. 10,449/60, the primary action being that of the temperature-sensitive switch, which in its turn controls the static regulating means. For example, if a catalytic device and switch are fitted to each cell of a battery, the switch may be used to bring into circuit the temperature-sensitive resistor or thermo-couple means, responsive to the temperature of the catalytic device, described in these specifications, say when the first or last of the switches operates. For each cell, the resistor or thermo-couple means may be combined with the temperature-sensitive switch as a unit on the catalytic device. In an alternative manner of operation, the switches may be arranged to reduce the charging current when the first cell starts to gas and to bring the temperature-sensitive resistor or thermo-couple means and associated control circuits of the said specifications into operation when the last cell starts to gas. In either case, the change in resistance or thermo-couple current may be used to cause an electro-magnetic, temperature-sensitive or gated-diode switch to operate to control the supply circuit or charging unit in such a manner as to vary the charging current as required. If temperature-senstive switches are set to operate only at abnormally high temperatures they can be utilised to give warning of failure of control means in accordance with the said specifications. If they are set to operate at low temperatures, they may serve to indicate the conditions of the individual cells of a battery.

Arrangements in accordance with the invention can be readily applied to existing types of charging systems by utilising the temperature-sensitive switch or switches to bring the charging means into or out of operation or to change the said charging means over from one to another value of the charging current, for example by introducing a resistance or reactance into circuit, as explained above. For such purposes, the contacts of the switch or switches may be disposed between the charging means and the battery or in the input circuit of the said charging means or at some intermediate point in the charging means.

Arrangements such as have been described above may be utilised or adapted for controlling the discharge of a battery. They may also be employed to operate indicating means showing the conditions of charging or discharging of a battery.

I claim:

1. An apparatus for supplying a controlled electrical charging current to an aqueous electrolyte electrical storage unit and for preventing the charging rate of the electrical current from substantially exceeding a charging rate which could cause substantial electrolysis of the electrolyte at various temperatures at which the said electrical storage unit is operable comprising, in combination, a charging circuit for the said electrical storage unit thereof, a catalytic device for catalyzing the exothermic recombination into water of the hydrogen and oxygen produced by the electrolysis of the electrolyte in the said electrical storage unit, said catalytic device in use being disposed in an operative gas-detecting relationship with the said electrical storage unit and being thermally responsive to the rate of recombination of the hydrogen and oxygen produced by the electrolysis of the electrolyte, and temperature-responsive switch means in the said charging circuit for detecting the temperature of the said catalytic device and for interrupting current flow through the said charging circuit when said catalytic device reaches a predetermined temperature.

2. An apparatus as defined in claim 1 in which means in the form of a shunt resistance is connected in parallel with the charging circuit to reduce the value thereof when the said switch means is in open-circuit position so that current of relatively reduced value will continue to flow through the said charging circuit to the said electrical storage unit.

3. An apparatus as defined in claim 1 in which the said electrical storage unit is in the form of a plurality of batteries, and in which at least one of said catalytic devices is in use disposed in operative relationship with each of said batteries, and in which one of said temperature-responsive switch means is arranged in the said charging circuit in association with each of said batteries, and in which the said switch means are connected in parallel with each other and in series in the said charging circuit, and in which an electrical signal lamp is connected in series with each of said switch means to indicate the flow of charging current from the charging circuit to each of said batteries.

References Cited in the file of this patent
UNITED STATES PATENTS

| | | |
|---|---|---|
| 1,314,629 | Andres | Sept. 2, 1919 |
| 1,424,731 | Linebarger | Aug. 1, 1922 |
| 2,309,054 | Fell | Jan. 19, 1943 |
| 2,421,523 | Rody | June 3, 1947 |
| 2,498,814 | Little et al. | Feb. 28, 1950 |
| 2,687,449 | Gulick et al. | Aug. 24, 1954 |
| 2,991,160 | Claussen | July 4, 1961 |